United States Patent [19]

Badger et al.

[11] 4,357,719
[45] Nov. 9, 1982

[54] NON RECIRCULATING METHOD OF DISPOSING OF WASTE PRODUCTS FOR AIRCRAFTS

[75] Inventors: Everett H. Badger, Irvine; Michael J. Rogerson, Newport Beach, both of Calif.

[73] Assignee: Rogerson Aircraft Controls

[21] Appl. No.: 238,511

[22] Filed: Feb. 26, 1981

Related U.S. Application Data

[60] Division of Ser. No. 68,131, Aug. 20, 1979, Pat. No. 4,275,470, which is a continuation of Ser. No. 58,586, Jul. 18, 1979, abandoned.

[51] Int. Cl.³ .......................................... B64D 11/02
[52] U.S. Cl. .......................................... 4/316; 4/323; 4/431; 4/434; 210/767
[58] Field of Search ............... 4/431, 316, 318, 415, 4/111, DIG. 11, 300, 321, 323, 432, 434, 435, 436, 437; 251/5, 61.1; 137/205; 210/167, 194, 767

[56] References Cited

U.S. PATENT DOCUMENTS

| | | | |
|---|---|---|---|
| 3,482,267 | 12/1969 | Liljendahl | 4/431 |
| 3,686,693 | 8/1972 | Liljendahl | 137/205 |
| 3,720,962 | 3/1973 | Harrah | 4/435 |
| 3,788,338 | 1/1974 | Burns | 137/205 |
| 3,811,135 | 5/1974 | Drouhard, Jr. et al. | 4/435 |
| 3,922,730 | 12/1975 | Kemper | 210/167 |
| 3,984,080 | 10/1976 | Varis et al. | 251/5 |
| 3,995,328 | 12/1976 | Carolan et al. | 210/167 |
| 4,170,048 | 10/1979 | Anthony | 4/434 |
| 4,232,409 | 11/1980 | Van Pham | 4/431 |

Primary Examiner—Benoît Castel
Attorney, Agent, or Firm—R. Welton Whann

[57] ABSTRACT

A method of flushing a toilet for aircraft or the line using vacuum and pressure, in which there is a toilet or other waste receiving bowl, a waste the holding tank, and a valve means for opening or closing the drain line. A vacuum is created in the waste holding tank and the drain line. The drain line is closed or opened by the action of the valve means. In the method the valve means is actuated by vacuum to open the drain line to connect the bowl to the holding tank to apply vacuum on the bowl to suck the contents from the bowl and deliver it to the holding tank. When the bowl has been emptied, pressure is applied to the valve means for closing the drain line to again build up vacuum in the system for subsequent operation.

17 Claims, 4 Drawing Figures

NON RECIRCULATING METHOD OF DISPOSING OF WASTE PRODUCTS FOR AIRCRAFTS

This invention relates to a method of disposing waste products on an aircraft and is a division of our application entitled Vacuum Flush Toilet Arrangement For Aircraft, Ser. No. 068,131, filed Aug. 20, 1979, (now U.S. Pat. No. 4,275,470), which was a continuation of Ser. No. 058,586 filed July 18, 1979, now abandoned.

DESCRIPTION OF PRIOR ART

It is known in the prior art to use vacuum and pressure to assist or carry out flushing operations in waste disposal systems in passenger vehicles such as buses, trains and aircraft. Currently, vacuum flush recirculating toilet systems are being used on commercial aircraft.

Such prior art systems, as shown for example by U.S. Pat. No. 3,995,328, Carolan et al, and U.S. Pat. No. 3,922,730, Kemper, employ a vacuum-powered toilet waste transmitting system in combination with a filtration process that recovers sufficient liquid from the waste matter so that the liquid, by being deodorized and appropriately colored, can be recycled as the flush fluid. Vacuum pressure or vacuum to operate these systems at lower elevations is provided by a blower system, whereas in flight at altitudes, vacuum pressure is maintained by venting a part of the system to the outside ambient air.

Such prior art systems and waste disposal methods have a number of disadvantages in that they are complex systems requiring numerous pumps, valves, filtration units and means for deodorizing and sanitizing the liquid waste used as the recirculating flushing fluid. As a result of this complexity, such systems, while an improvement over gravity flow systems, are still relatively heavy and require a high degree of maintenance without a commensurate improvement in the overall reliability of the system.

SUMMARY OF THE INVENTION

The present method is superior to any vacuum flush method known to applicants' and consists of a method which is unique in its entirety and in the steps performed. The present method uses only fresh or potable water where needed, the water being used in relatively small amounts.

The advantages of using a non-recirculating water system is that it eliminates all of the structural parts and steps required to separate the water from the waste and to strain, purify and recirculate. In applicants' method the usual fresh water tank on the aircraft, such as for drinking, can be used as a flushing medium for the vacuum operated toilet because it uses such little water. By the elimination of the recirculating system considerable weight, which is an important feature on aircraft, is eliminated.

In applicants' method the complete fresh water vacuum actuated toilet waste system operation is completely automatic and only requires that the user initiate the flush cycle by depressing a handle or button. This manual initiation of the method causes the electronic control module to initiate the flushing action of the fresh water (if such water is used) and it opens the bowl through the flush control valve to a vacuum holding tank, then after a fixed time interval, completes the flush cycle so as to be ready for another flush.

In another form of the invention in which the bowl module employs an ultrasonic transducer to enhance the flushing action of the water, the transducer operation without the presence of fresh water makes possible a clean dry flush. However, in most installations a small amount of water may be utilized for psychological effect.

OBJECTS OF THE INVENTION

It is an object of the invention to provide a fresh water vacuum-flush toilet waste method for use in an aircraft and the like.

Another object of the invention is to provide a fresh water vacuum-flush toilet waste method that will operate without the use of gravity, thereby allowing the toilet module and waste holding module to be positioned in any desired location.

Another object of the invention is to provide a fresh water vacuum-toilet method in which no motors are used and the entire flushing sequence is electronically controlled.

It is an object of our invention to provide a method which operates without requiring any outside source of energy. The method is performed by the use of pressure or vacuum, and the pressure which it uses is cabin pressure and the vacuum which it uses is vacuum derived from the waste holding tank on the aircraft.

It is a still further object of our invention to provide a non-recirculating method which uses no recirculation of rinse water in which the valve which shuts off the drain from the waste holding tank to the waste disposal bowl is opened by use of vacuum obtained from the drain line.

In our invention the flush valve is closed by air or fluid pressure which is applied in the flush valve. In order to move the valve to an open position vacuum is applied. This is done by sucking the air or fluid pressure from a control pressure tank.

It is an object of our invention to provide the step of accumulating a volume of vacuum for the purpose of opening the valve and for the purpose of having adequate vacuum to hold the valve open so that the entire contents may be removed from the bowl and delivered to the waste holding tank.

It is another object of our invention to provide a method of the class described in which the drain pipe is opened and closed by means of a flexible valve element and in which the valve element is moved from closed to open positions by performing the step of applying pressure to the surface of the flexible valve member to close it and a vacuum to the surface of the valve member to open it.

Other objects of our invention will be made evident during the following detailed description of our invention.

DESCRIPTION OF THE PREFERRED EMBODIMENT

Figure 1:
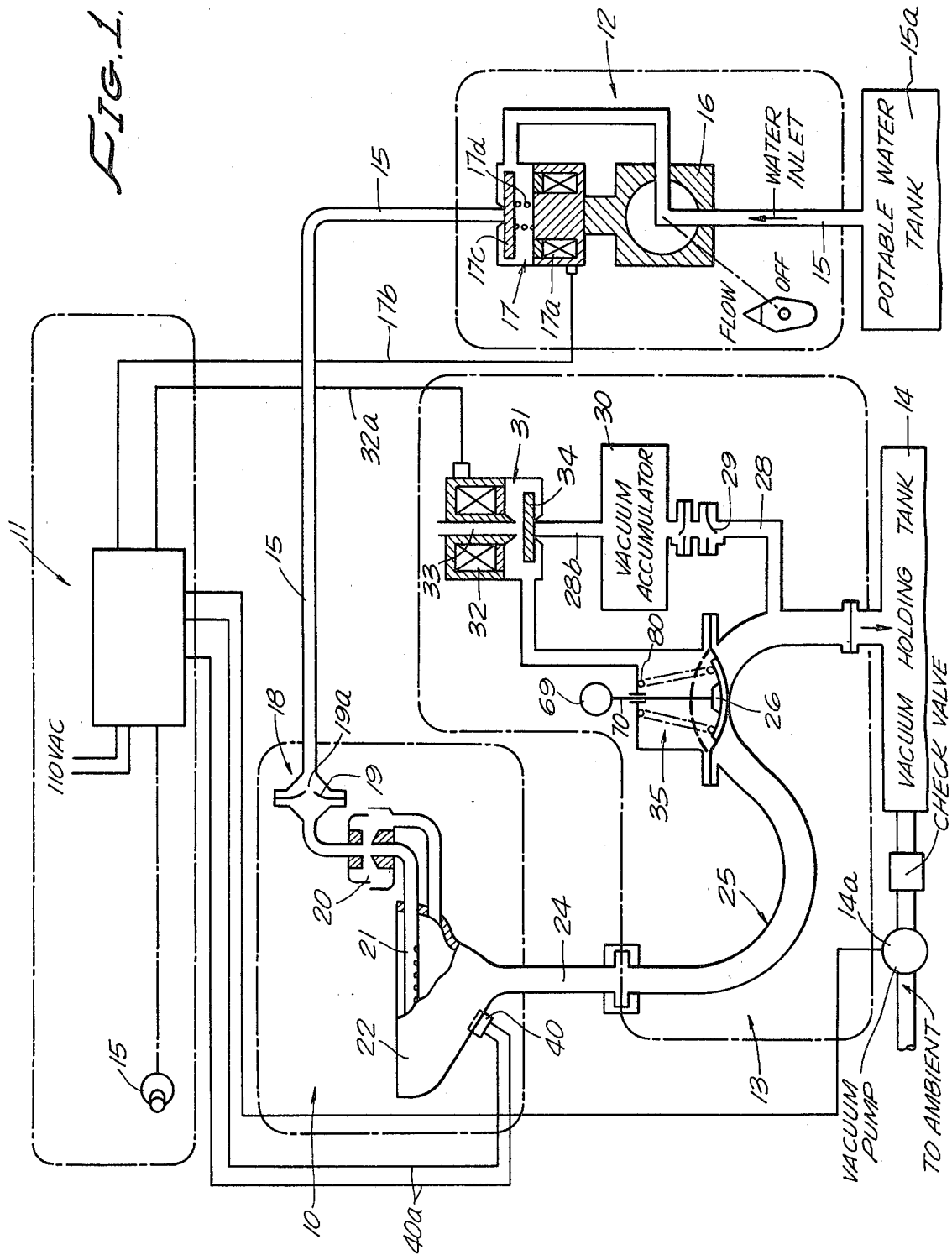
FIG. 1 is a schematic drawing illustrating applicants' invention and a preferred embodiment of the toilet module of the fresh water vacuum-flush toilet system which performs the method of our invention.

Referring first to FIG. 1, the toilet module, which forms a part of the apparatus which performs the method of our invention, comprises four sub-modules which are shown within dotted line areas of FIG. 1. The four submodules comprise a bowl module 10, an electronic control module 11, a water control module 12 and a flush valve module 13. Initiation of the flush cycle of the toilet is controlled by a button or handle 11a which may be located in a convenient place. Once a flush cycle is activated by actuating the control 11a, the electronic control module 11 sequences all necessary operations of the invention including signals to a remote vacuum blower 14a if the vacuum in the holding tank 14 is below a pre-set value.

As shown in FIG. 1, there is a fresh water supply line 15 which extends from a source of fresh or potable water under pressure 15a. The fresh water supply line includes a shut-off valve 16 and a solenoid valve 17 through which the water must flow. The valve 17 has a solenoid coil 17a which is energized from the control module 11 through an electrical conductor or cable 17b. The clapper valve 17c is held against its seat by a light spring 17d which closes the fresh water supply 15 at this location. Water pressure below the clapper valve 17c increases the seating pressure so that no water can proceed to the toilet bowl.

Figure 2:
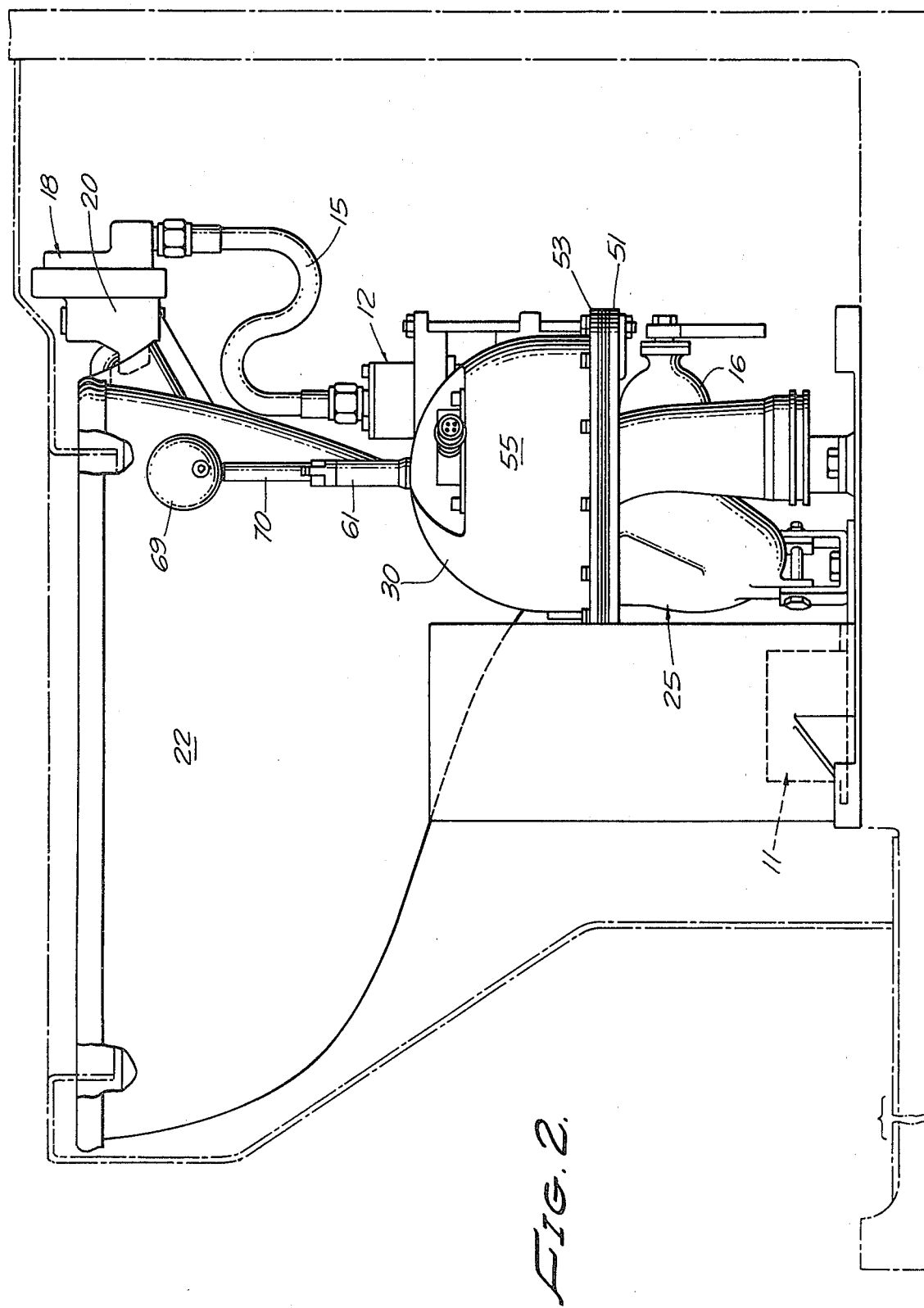
FIG. 2 is a side elevational view illustrating the assembled positions of the toilet module, the fresh water supply module, and the flush control module.

Mounted on the side of the toilet bowl as shown in FIG. 2 is a unitized flow regulator 18 and an anti-siphon valve 20 which prevents reverse flow through the supply line 15 and thus prevents inadvertent contamination.

The flow regulator 18 has a member 19 which is preferably pre-formed from silicon rubber and has a variable orifice 19a therein which is distorted by water pressure drop. If the water pressure in the line 15 changes, the member 19 moves accordingly, changing the size of the orifice therein, thus regulating the flow of water to the toilet bowl irrespective of the water pressure. The anti-siphon valve 20 employs a jet-type sanitary water break without moving parts and prevents inadvertent contamination of the potable water supply. Also, this air bleed into the water system allows the system to drain when the supply water pressure is removed. An integral scupper returns any excess splash or back-up water to the bowl.

The water is delivered from this combination flow regulator and vacuum breaker to the spray ring 21 positioned in the upper part of the toilet bowl 22.

Extending downwardly from the bowl 22 is a drain 24 which includes a gooseneck 25 having the flush valve 26 positioned therein.

The gooseneck 25 is in the form of a metal casting and is designed to prevent the entry of large soft or solid contaminants which might not proceed through the remainder of the drain system. In a present embodiment of the invention, the smallest diameter of the gooseneck which is 1.5 inches is positioned near the bowl outlet and through the first curve of the gooseneck. The diameter then smoothly increases to 1.75 inches through the area of the diaphragm valve 26. Where the gooseneck extends downwardly toward the holding tank, the diameter is 2.0 inches.

Connected to the gooseneck on the down flow side of the flush valve is a vacuum line 28 and 29b having a fire-safe bimetallic safety valve 90 and having a check valve 29, which leads to a vacuum accumulator chamber 30. Solenoid valve 31 has a solenoid coil 32 connected by electrical conductor 32a to the control unit and through which it is energized. Opposite the vacuum line 28b is a passage 33 connected to the interior of the aircraft. When the valve 34 is in the position shown in FIG. 1, the control chamber 35 of the flush valve assembly 26 is connected to the pressure within the cabin and at that time the diaphragm valve 26 is in a position which closes the vacuum line 28b. When the solenoid 32 is energized, the valve 34 is moved to an upper position closing the passage 33 and opening the vacuum passage 28, connecting it to the control chamber 35. At this time, the diaphragm valve 26 moves to an open position.

Although not essential in most cases, numeral 40 shows a vibrating element which vibrates the toilet bowl to assist in disposing of the waste matter in the bowl. This vibrator element 40 is controlled through electrical wires 40a which extend to the control unit 11.

Before proceeding to a description of the details of a preferred construction and operation of the flush valve assembly a brief explanation of the general steps of our method will be given and following this will be presented the details of certain additional features of our invention.

A flush cycle of our invention is initiated by pushing the control botton 11a which actuates the control module 11 to initiate the sequencing of the flush cycle by first actuating the solenoid 17 which opens the valve 17c by moving it downward against the action of the spring 17d and water pressure. This opens the fresh water line supply 15 allowing water to flow under pressure to the toilet bowl module 10. The water usually enters the system under 15-30 pounds pressure. The water flows through the flow regulator 18 and the anti-siphon device 20 to the spray ring 21 where it discharges the water on the inner surface of the bowl.

The next step is to sequence the flush control module 13 by energizing the solenoid 32 of the valve 31 which raises the clapper valve 34 into its raised position and closes the passage 33 to the pressurized cabin of the aircraft. This changes the pressure in the control chamber 35 from cabin pressure to ambient pressure of vacuum and thus causes the valve 26 to open. When the flush valve 26 opens, vacuum from the waste holding tank 14 is placed on the toilet bowl. This sucks the water material and flush water in the bowl outwardly through the drain gooseneck 25 and the drain 24 to the holding tank 14. The waste holding tank 14 is placed under vacuum by the blower 14a at low elevations and ambient air at higher elevations.

The control module 11 is provided with means in which the voltage to operate the valves 17 and 31 is reduced to a low voltage approximately 0.5 seconds after the solenoids are energized by the higher voltage. This causes positive high-force operating voltage to move the clappers from their seats and thereafter automatically lowers the power to approximately 10 volts D.C. for a holding current. This is adequate to keep the solenoids in energized position and greatly reduces heat generation.

Figure 3:
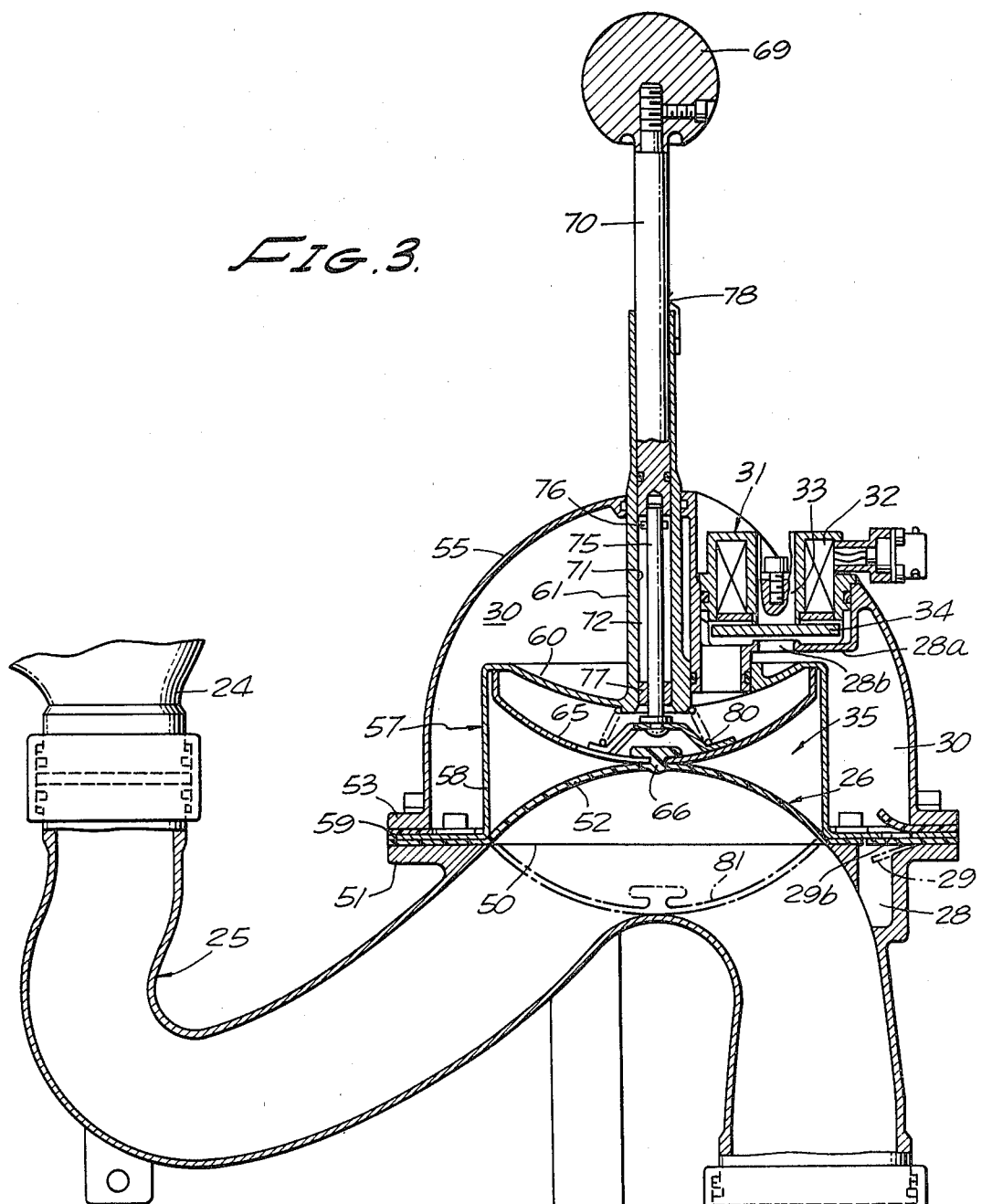
FIG. 3 is a cross-sectional view through the gooseneck of the drain passage from the toilet bowl and the vacuum operated flush valve and its vacuum controlled operating mechanism.

FIG. 3 shows a cross-sectional view of the gooseneck 25 and the flush control valve 26. The gooseneck has an opening 50 surrounded by an external attaching flange 51. A flexible diaphragm 52 is held across the opening 50 by the bolted-on flange 53 of a vacuum accumulator housing 55 which provides the vacuum accumulator 30. A control chamber 35 is formed by a cylindrical housing 57 which has a cylindrical wall 58 with a bottom flange 59 which extends radially outwardly and is clamped between the flanges 51 and 53. The housing 57 has a top wall 60 from which a tubular extension 61 extends upwardly through the dome-shaped wall which forms the accumulator chamber 30. In the control chamber 35 above the diaphragm valve element 52 is a curved semi-cylindrical metal diaphragm engager 65 which at its center is connected by means of a connector element 66 to the center of the diaphragm 52.

A manual override handle 69 has a downwardly extending rod 70 which in its lower end has an opening 71 and a cross slot 72. Connected to the valve engager 65 is a rod 75 which extends into the opening 71 and has a cross pin 76 extending into the cross slot 72 on both sides of the opening 71. The lower end of the rod 70 has a ring-shaped bushing 77 which closes the lower end of the cross slot 72.

The length of the opening and slot in which the rod 75 extends is about the length of travel of the inner shaft or rod when the diaphragm valve moves between open and closed positions. Thus, the manual override handle does not move during a normal flush valve function. However, when manual override is desired, the handle is pulled off of the detent 78 and lifted until the bushing 77 engages the cross pin 76 and at this point the inner shaft 75 is lifted. This opens the diaphragm valve. When the manual override is pushed downward past the spring detent, the valve is closed.

Figure 4:
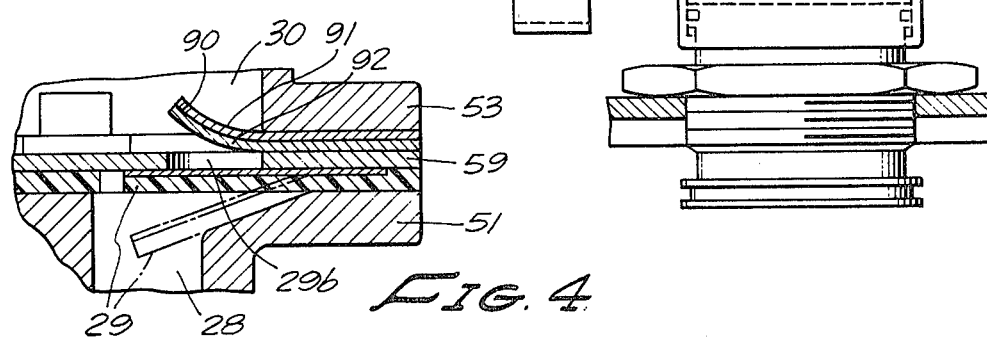
FIG. 4 is an enlarged fragmentary view showing the fire-safe bimetal valve and check valve which is part of the flush valve module.

As shown in FIG. 4, the vacuum passage 28 which is connected to the gooseneck extends through a portion of the fitting or flange 51 where the check valve 29 is located. As shown in the enlarged view, the check valve moves between closed position as shown in full lines and open position as shown in broken line position and it functions as previously explained. As shown in FIG. 4 the check valve 29 is normally in a closed position. If we assume that the valve is in a position in which there is pressure in the control pressure chamber 35 at this time, with the valve closed, there is the highest degree of vacuum in the drain pipe on the downstream side of the valve and vacuum accumulator 30 contains the same degree of vacuum as the drain. When the valve control means is operated to connect the vacuum line to the control pressure chamber 35, air in the control pressure chamber will be drawn into the accumulator thus reducing the pressure in the control pressure chamber 35 and the valve will be moved to open position. At the time the valve element 52 is moved from its closed position, the vacuum at the passage 28 will be reduced or in other words, the pressure will be increased. This increase in pressure will hold the check valve in a closed position so that vacuum in the vacuum accumulator 30 will not be destroyed or diminished but will be solely used for the purpose of opening the flexible valve element 52 and hold it in an open position so that the contents of the toilet bowl can be completely removed and delivered to the vacuum holding tank. If it were not for the check valve 29, the instant the valve 52 were moved from its seated position this would cause a reduction in vacuum in the vacuum accumulator and this reduction is vacuum would affect the operation of the valve so that it might not be fully open or move into an open position. The passage 29b which forms a part of the passageway 28 leads to the accumulator 30.

The clapper valve 34 is positioned above a wall 28a having an opening 28b in it which forms a continuation of the passage 28. When the solenoid 32 is energized, the valve 34 is in raised position and the opening 38b connects the vacuum accumulator space 30 with the control chamber 35 and thus produces a vacuum in the chamber 35 which raises the diaphragm valve 52 and the valve engager 65 into a raised position. The parts are now in the position shown by full lines in FIG. 3.

However, when the solenoid 32 is de-energized and the valve 34 allowed to lower into a position to close the passage 28b, the chamber 35 is in communication with cabin pressure through the passageway 33. At that time, this pressure from the cabin pushes downwardly on the diaphragm and diaphragm engager and assisted by a spring 80 moves the diaphragm into a closed position as indicated by dotted lines 81. This shuts off the passageway through the gooseneck. This dotted line position of the diaphragm 81 is the normal closed position of the flush valve and it remains in this position except when actuated by the control module 11.

Many parts of the structure which performs our method are made from light plastic-type materials and are not fireproof. If a fire should occur and if the parts of the vacuum drain line were destroyed, or if the flush valve were destroyed so that the drain passage would be open, this would create air flow within the plane causing the fire to burn or enlarge its area more rapidly. One of the important features of our invention is the step in our method of eliminating vacuum flow through the exhaust line if any parts of the toilet were destroyed.

The gooseneck 25 and portions of the drain extending to the vacuum holding tank are made of metal. The diaphragm valve element 52, however, is formed of a non-metallic material and, therefore, if not protected, would be subject to destruction. In our invention we provide the valve engager 65 as shown in FIG. 3 which is metal and when the valve is closed, this metal engager 65 engages and closes off the diaphragm 52.

The bimetallic element 90 having two layers of metal 91 and 92. When the bimetallic valve 90 is heated, it will straighten and move from its curved position into a position to close the opening 29b, thus shutting off any flow of air through this opening. In other words, this opening 29b is closed and, therefore, there cannot be any air flow at this point.

A brief resume of our complete invention will now be given. Normally the flush valve is closed and the flush valve method is ready to be performed. At this time there is cabin air pressure in the control chamber and the valve is held in a closed position. There is at this time vacuum in the waste holding tank and in the drain or drain line up to the valve. With the parts in this position, there is the highest vacuum in the drain line and also in the vacuum accumulator which is employed to open the valve.

When it is desired to flush the toilet or waste bowl, cabin air pressure to the control chamber is shut off and the vacuum line is opened which immediately draws the air from the control chamber and into the vacuum accumulator, the accumulator increasing in pressure as the control chamber is decreased in pressure. With the reduction in pressure in the control chamber the flexible valve element opens because there is a vacuum or very low pressure placed on the outer surface of this valve element at this time.

The valve will fully open and full vacuum pressure from the drain will be applied to the bowl which draws the contents from the bowl into the drain line and to the waste products tank. As stated before, maintaining the vacuum in the accumulator furnishes sufficient vacuum to hold the flush valve open for a long enough period for all of the contents to be withdrawn from the bowl and delivered to the flush disposal tank.

At the end of a predetermined period of time the vacuum line to the control chamber is closed and the valve to the cabin is opened, thus applying pressure in the control pressure chamber which closes the valve. When the valve is closed, the vacuum in the drain will be built up and also the vacuum in the vacuum accumulator will be built up to its maximum ready for a subsequent operation of the method.

We claim:

1. A non-recirculating method of disposing of waste products in aircraft which has a waste receiving bowl, a waste holding tank, a drain line connecting said bowl and said holding tank, and a valve means having a valve element for opening and closing said drain line, comprising the following steps:
    a. creating a vacuum in said waste holding tank and said drain line,
    b. utilizing said valve element for opening or closing said drain line,
    c. applying fluid pressure directly to an outer surface of said valve element to move the same into a drain line closing position,
    d. applying a vacuum directly to the outer surface of said valve element to move said valve element into a drain opening position,
    e. closing said drain line near said bowl by said valve means so that no vacuum is applied to said bowl,
    f. opening said drain line to said bowl by use of said vacuum so as to apply vacuum to said bowl to suck the contents from said bowl and deliver same to said waste holding tank, and
    g. again closing said drain line and building up said vacuum in order to place said system in condition for a subsequent operation of said disposal system.

2. A method as defined in claim 1 which also includes the step of utilizing cabin pressure to close said valve and utilizing vacuum in said drain line to open said valve.

3. A method as defined in claim 1, the step of controlling the flow through said drain line by utilizing a flexible valve element which is movable from a position to close said drain line into a position to open said drain line; applying fluid pressure to the outer surface of said flexible valve element to move the same into a drain line closing position; and utilizing vacuum from said drain line on the downstream side of said flexible valve element which is applied to the outer surface of said flexible valve element to move said flexible valve element into an open position whereby vacuum is applied to said bowl to remove the contents thereof and deposit same in said waste holding tank.

4. A method as described in claim 3 which includes the step of closing said flexible valve element and building building up a supply of vacuum in a vacuum accumulator in order that there will be ample vacuum to hold the flexible valve element in an open position for a period adequate to fully remove the contents from said bowl and deliver same to said waste holding tank, and restraining a loss of vacuum from said vacuum accumulator by a reverse flow from said accumulator into said drain line.

5. A method as defined in claim 1, which includes the step of applying a minimum amount of water to said bowl to assist in cleaning said bowl during the step of sucking the contents therein.

6. A method as defined in claim 1, which includes the step of applying a minimum amount of water to said bowl to assist in cleaning said bowl during the step of sucking the contents therein, and after repeated waste disposal steps, removing the contents of said holding tank at a ground location.

7. A method as defined in claim 1, which includes the step of applying a minimum amount of water to said bowl to assist in cleaning said bowl during the step of sucking the contents therein, including the step of delivering a small quantity of rinse liquid to said bowl to wash the walls thereof and withdrawing said rinse liquid to said holding tank along with said contents from said bowl.

8. A method of flushing a non-recirculating vacuum-operated waste disposal system in aircraft wherein a waste disposal bowl is connected to a drain line extending to a waste holding tank which is maintained under vacuum and in which there is a flush valve in said drain line for opening and closing said drain line, said flush valve having a valve element movable between open and closed positions and a control chamber adjacent said valve element whereby a fluid pressure in said control chamber will close said flush valve and a vacuum in said control chamber will open said flush valve, comprising the steps of:
    a. normally applying fluid pressure to said control pressure chamber to normally hold said valve closed,
    b. applying a vacuum to said control pressure chamber to open said flush valve element in order to apply said vacuum from said waste holding tank to said bowl to suck the contents thereof from said bowl and deliver the same to said waste holding tank, and
    c. discontinuing said vacuum in said control chamber and again applying fluid pressure therein in order to move said flush valve element into a closed position to close communication of said toilet bowl from said holding tank.

9. A non-recirculation method of disposing a waste product on aircrafts having a disposal bowl, a waste holding tank, a drain line connected to said bowl, a pressure-vacuum operated flush valve for opening and closing said drain line and said holding tank and in which there is no recirculation of rinse water, the method comprising:
    a. applying vacuum to said holding tank and said drain line,
    b. closing said drain line at a location near said bowl by means of said pressure-vacuum operated flush valve,
    c. applying a vacuum to said flush valve to open same to apply vacuum to said bowl and to thereby withdraw its contents and deliver the same through said drain line to said holding tank, and
    d. thereafter operating said valve by use of pressure for closing said flush valve to close said bowl from said holding tank and to build up vacuum in said drain line from said holding tank in readiness for a subsequent operation.

10. A method as defined in claim 9, in which after repeated waste disposal operations, removing the contents of said waste holding tank at a ground location.

11. A method as defined in claim 9, in which said vacuum to operate said flush valve is supplied from said drain line and in which there is a storing of vacuum adequate to hold said flush valve open for a period of time sufficient to withdraw the entire contents from said bowl and deliver same to said holding tank.

12. A method of flushing a non-recirculating vacuum-operated waste disposal system in aircraft wherein a waste disposal bowl is connected to a drain extending to a waste holding tank which is maintained under vacuum and in which there is a flush valve in said drain for opening and closing said drain, said flush valve having a single flexible valve element movable from a position across said drain to close same into a position to one side of said drain to open said drain to place a vacuum on said waste bowl, comprising the steps of:
 a. forming a control chamber in which said flexible valve element forms a wall thereof,
 b. applying a vacuum to said control chamber to open said valve element in order to apply said vacuum from said waste holding tank to said waste disposal bowl to suck the contents thereof from said bowl and deliver same to said waste holding tank, and
 c. discontinuing said vacuum in said control chamber and supplying fluid pressure to said control chamber to apply fluid pressure directly to the surface of said flexible valve element to move said flexible valve element into a position to close said drain.

13. A method as defined in claim 12 which also includes the step of providing a vacuum accumulator between said control chamber and a vacuum source to adequately provide an amount of vacuum adequate to hold said flexible valve element in an open position for a period of time sufficient to withdraw the entire contents from said waste disposal bowl and deliver same to said waste holding tank.

14. A method as defined in claim 13, which includes the step of preventing any reverse flow from said vacuum accumulator to said source of vacuum.

15. A method as defined in claim 12 which uses the vacuum in said waste holding tank for the dual purpose of moving said flexible valve element into an open position and for withdrawing the contents of said waste disposal bowl.

16. A method as defined in claim 15 which also includes the step of, when said flexible valve element is in closed position, building up the volume of vacuum so that when vacuum is applied to the outer surfaces of said valve element, the vacuum is adequate to hold said flexible valve element in open position for a sufficient length of time to empty said waste disposal bowl.

17. A method of a non-recirculating vacuum-operated waste disposal system in aircraft wherein a waste disposal bowl is connected to a drain extending to a waste holding tank which is maintained under vacuum and in which there is a flush valve in said drain for opening and closing said drain, said flush valve having a single flexible valve element movable from a position across said drain to close same into a position to one side of said drain to open said drain to place a vacuum on said waste disposal bowl, comprising the steps of:
 a. applying fluid pressure directly to the outer surface of said flexible valve element to move and hold same in a closed position to close said drain,
 b. removing said fluid pressure from said outer surface and applying vacuum from the downstream side of said flexible valve element to said outer surface of said flexible valve element to move said flexible valve element into a position to open said drain into connection with said waste disposal bowl to empty said waste disposal bowl,
 c. again applying fluid pressure to the outer side of said flexible valve element to move same into a closed position, and
 d. while said flexible valve element is in closed position, building up a supply of vacuum adequate to hold said flexible valve element in open position for a period of time sufficient to fully empty said waste disposal bowl.

* * * * *